United States Patent
Klock et al.

(10) Patent No.: US 7,382,366 B1
(45) Date of Patent: Jun. 3, 2008

(54) METHOD, APPARATUS, SYSTEM, AND GRAPHICAL USER INTERFACE FOR SELECTING OVERCLOCKING PARAMETERS OF A GRAPHICS SYSTEM

(75) Inventors: Michael M. Klock, Austin, TX (US); Jeffrey M. Smith, Union City, CA (US); Satish D. Salian, Santa Clara, CA (US); Kevin J. Kranzusch, Campbell, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 10/690,918

(22) Filed: Oct. 21, 2003

(51) Int. Cl.
G09G 5/00 (2006.01)
G06T 1/00 (2006.01)
G01D 3/00 (2006.01)
G06F 1/00 (2006.01)
G06F 15/00 (2006.01)
G06T 15/00 (2006.01)
G06F 1/04 (2006.01)

(52) U.S. Cl. ............... 345/213; 345/418; 345/501; 345/522; 345/534; 702/108; 702/125; 713/500; 713/600

(58) Field of Classification Search .......... 713/500, 713/400, 375, 503, 600; 345/213–214, 418, 345/501–506, 522, 531–534; 702/108, 119, 702/121, 125; 324/718, 532–535
See application file for complete search history.

(56) References Cited

U.S. PATENT DOCUMENTS

| 5,568,055 A * | 10/1996 | Olsen | 324/718 |
| 6,340,972 B1 * | 1/2002 | Fox | 345/426 |
| 6,384,833 B1 * | 5/2002 | Denneau et al. | 345/522 |
| 6,535,986 B1 * | 3/2003 | Rosno et al. | 713/400 |
| 6,567,868 B1 * | 5/2003 | Tran et al. | 710/60 |
| 6,622,254 B1 * | 9/2003 | Kao | 713/500 |
| 6,691,242 B1 * | 2/2004 | Pollock et al. | 713/503 |
| 6,754,840 B2 * | 6/2004 | Poisner | 713/500 |
| 2001/0009022 A1 * | 7/2001 | Feierbach | 711/106 |
| 2002/0062484 A1 * | 5/2002 | Fung | 713/300 |
| 2002/0143488 A1 * | 10/2002 | Cooper et al. | 702/132 |
| 2002/0164084 A1 * | 11/2002 | Baggs | 382/275 |
| 2005/0049729 A1 * | 3/2005 | Culbert et al. | 700/50 |
| 2005/0071705 A1 * | 3/2005 | Bruno et al. | 713/500 |

OTHER PUBLICATIONS

Bigjakkstaffa, "Overclocking a Video Card", May 20, 2003, http://www.sysopt.com/articles/VCOGuide/.*
Gasior, "TR's GeForce4 Ti 4200 comparo", Aug. 30, 2002, http://techreport.com/reviews/2002q3/ti4200s/index.x?pg=1.*
Cateney Systems, "Compare Two Images, Looking for Changes", 2002, http://www.catenary.com/howto/compare.html.*
Jonkeren; "MSI News Update;" *MSI News Update*, Jun. 200; pp. 1-8.

(Continued)

Primary Examiner—Wesner Sajous
(74) Attorney, Agent, or Firm—Cooley Godward Kronish LLP

(57) ABSTRACT

Overclocking parameters in a graphics system are automatically set. In one embodiment, in response to a user request, overclocking parameters for different sets of overclocking parameters are tested using a graphical stress test to select optimum overclocking parameters.

18 Claims, 8 Drawing Sheets

OTHER PUBLICATIONS

On-line document; News Release; "MSI™ Announces COMDEX Fall 2000 Products Leading Mainboard Manufacture Unveil the last High-End Mainboard, VGA Cards . . . " http://www.msi.com.tw/html/newsrelease/MSI_news/2000_comdex1317.htm; Jul. 14, 2003; pp. 1-2.

On-line document; News Release; MSI™ Own Creation: Fuzzy Logic™ 3 AI Speeding up . . . ; http://www.msi.com.tw/html/newsrelease/MSI_news/2000_1106_fuzzy3.htm; Jul. 14, 2003; p. 1.

* cited by examiner

METHOD, APPARATUS, SYSTEM, AND GRAPHICAL USER INTERFACE FOR SELECTING OVERCLOCKING PARAMETERS OF A GRAPHICS SYSTEM

FIELD OF THE INVENTION

The present invention is generally directed towards selecting parameters of an integrated circuit. More particularly, the present invention is directed towards selecting overclocking parameters of a graphics system.

BACKGROUND OF THE INVENTION

A graphics system may be "overclocked", i.e., one or more of its components operated at a clock rate above a default clock rate, in order to boost performance. For example, a component of a graphics system, such as a graphics processing unit (GPU), may be overclocked to increase the frame rate of a high performance graphics application. Similarly, a graphics memory may be overclocked in order to increase its memory bandwidth, which in some cases may also increase the frame rate of the graphics system.

In the context of graphics systems, some personal computer products permit an overclocking mode to be manually selected. For example, some graphics systems permit developers and enthusiasts to select clock rates and other overclocking parameters. A benchmark software program may then be run to evaluate performance in terms of frames per second (frame rate) and picture quality. An optimum selection of overclocking parameters may then be selected by the user by testing a matrix of overclocking parameters and running the benchmark program for each entry of the matrix to find optimum overclocking parameters. This permits, for example, game enthusiasts a technique to increase the performance of three-dimensional games.

However, a drawback of overclocking a graphics system is that it is more difficult than desired to implement. Improper selection of overclocking parameters can generate graphical aberrations and excessively shorten the lifetime of a graphical system. Additionally, when a consumer tries to manually determine maximum overclocking parameters they commonly increase overclocking parameters in increments until the graphics chip doesn't work properly, what is often known as "hanging" the chip. Hanging the chip necessitates the consumer rebooting the system and selecting reduced overclocking parameters, which increases the difficulty of setting safe optimum overclocking parameters. Moreover, overclocking is difficult for ordinary consumers to implement, since they may lack the skills and patience to perform the time consuming set of procedures required to select optimum safe overclocking parameters.

Therefore, what is desired is an improved apparatus, system, method, and user interface for overclocking an integrated circuit.

SUMMARY OF THE INVENTION

An apparatus, system, method, and graphical user interface is disclosed for selecting overclocking parameters in a graphics system. In some embodiments the overclocking parameters include a clock rate of a graphics processor unit (GPU) and a memory clock rate of a graphics memory. One aspect of the present invention is that it decreases the time and increases the convenience for a user to select optimum overclocking parameters.

One embodiment of a method of the present invention includes: receiving a user request for overclocking; forming sets of overclocking parameters to be evaluated; each set of overclocking parameters having at least one overclocking parameter that is unique; for each set of overclocking parameters, applying a stress test to evaluate graphical performance of a graphics system; and determining a set of overclocking parameters passing the stress test. In some embodiments, the stress test determines a number of errors generated by a graphics pipeline of the graphics system executing a test program sequence of graphical operations. In some embodiments, the stress test is passed if the number of errors is no greater than a preselected number of errors.

One embodiment of a graphics system of the present invention includes a GPU, and an overclocking control module for selecting and evaluating overclocking parameters, the graphics system configured to automatically test overclocking parameters and determine maximum safe operating parameters in response to a user request.

One embodiment of a graphical user interface of the present invention includes: a control panel for displaying overclocking parameters of a graphics system, the control panel permitting a user to select an automatic overclocking mode, the control panel instantiating a function call to the graphics system to test different overclocking parameters, set optimized overclocking parameters, and return optimized overclocking parameters to the control panel in response to the user selection of the overclocking mode.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
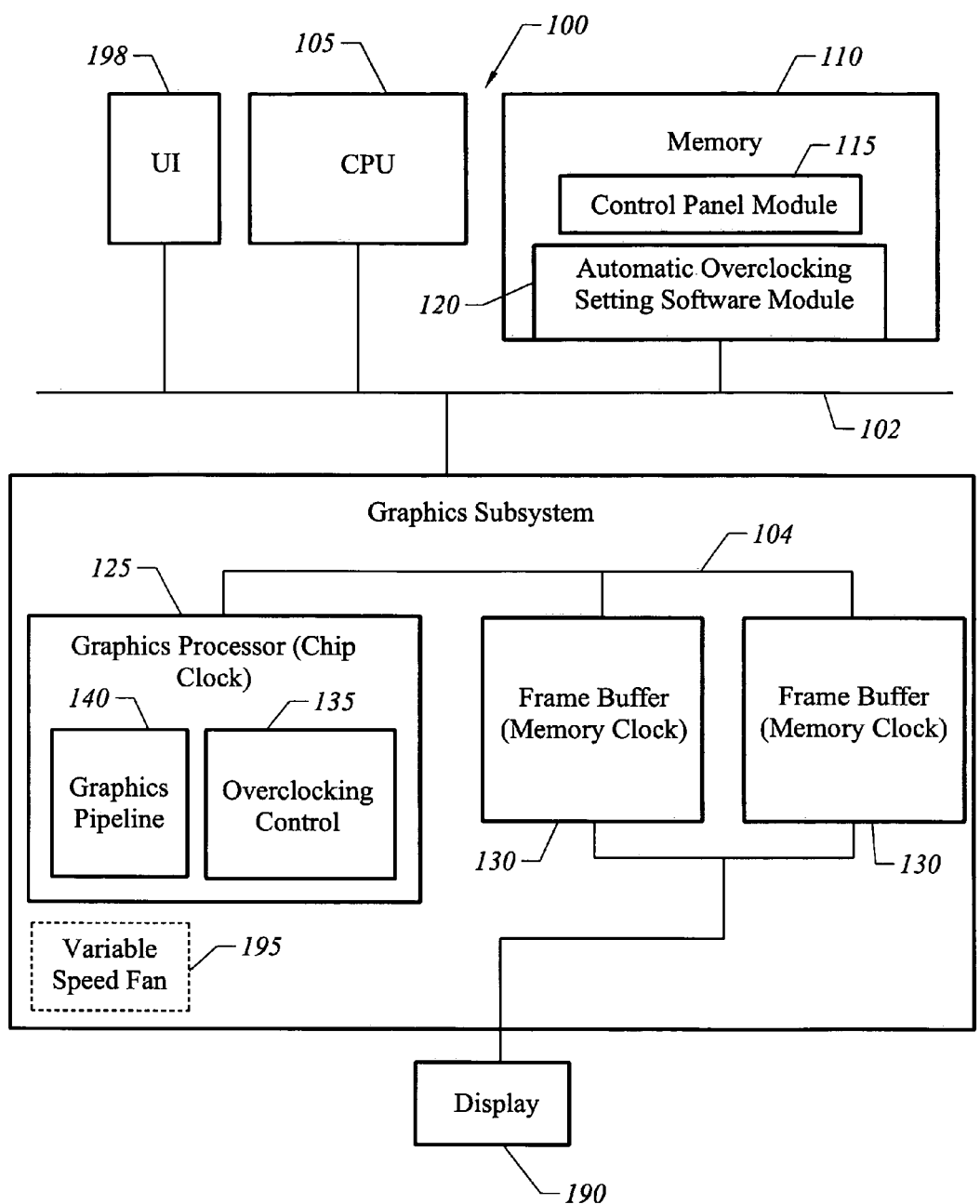
FIG. 1 is a block diagram of a graphics system in accordance with one embodiment of the present invention.

The present invention is generally directed towards an apparatus, system, method, software driver module, and user interface for setting overclocking parameters of a graphics system. FIG. 1 is a functional block diagram illustrating a graphics system 100 in accordance with one embodiment of the present invention. System 100 includes a central processing unit (CPU) 105 coupled to a system bus 102. A system memory 110 for storing program instructions executable on CPU 105 is also coupled to system bus 102. System memory 110 includes a control panel software module 115 and an automatic overclocking setting software module 120. A user input device 198 permits a user to input commands to CPU 105.

CPU 105 is coupled to a graphics processor unit (GPU) 125 by a system bus 102. CPU 105 acts with GPU 125 to generate graphical images on a display 190 that is coupled to GPU 125. GPU 125 includes a graphics pipeline 140 for rendering graphical images. A graphics memory 130 is coupled to GPU 125 by a graphics bus 104. Graphics memory 130 may, in some embodiments, correspond to one or more frame buffers. The memory bandwidth of graphics memory 130 will depend upon the bus width of graphics bus 104 and also upon the memory clock rate.

Graphics system 100 includes one or more chips that may be overclocked, such as GPU 125 and the graphics memory 130. Thus, in one embodiment, the overclocking parameters are comprised principally of a core clock rate of GPU 125 and a graphics memory clock rate of graphics memory 130, although it will be understood that the overclocking parameters may include other settings, such as a GPU chip voltage, fan speed (for cooling), memory timings (for the memory clock), and drive/slew values for different memory clock values. However, it will also be understood that the present invention may be applied to a graphics system in which a single clock rate is varied (e.g., a GPU clock rate or a clock rate of a CPU with built-in GPU functionality) as well as to systems in which the clock rates of two or more processors may be overclocked (e.g., a graphics system with two or more GPUs or a GPU and a co-processor).

GPU 125 includes an overclocking control module 135. As described below in more detail, overclocking control module 135 acts to evaluate overclocking parameters during an automatic test and set-up process instantiated from automatic overclocking setting software module 120. In one embodiment, overclocking control module 135 is implemented as a combination of hardware and software.

Figure 2:
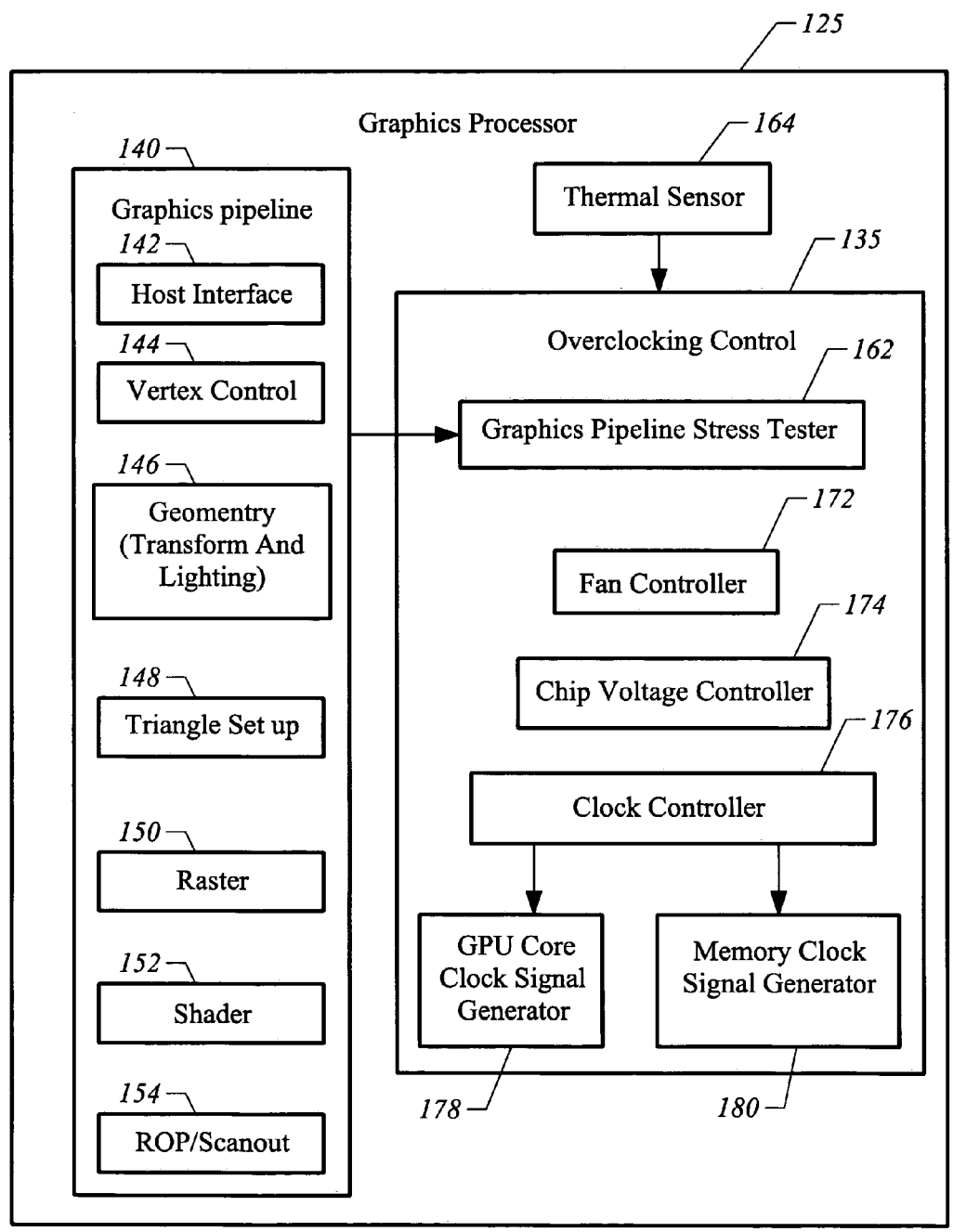
FIG. 2 is a block diagram of a graphics processing unit in accordance with one embodiment of the present invention.

FIG. 2 is a block diagram illustrating one embodiment of GPU 125. In one embodiment, graphics pipeline 140 has a host interface stage 142, vertex control stage 144, transform and lighting stage 146, triangle set-up stage 148, raster stage 150, shader stage 152, and ROP/scanout stage 154.

In one embodiment, overclocking control module 135 includes a performance monitoring functionality. A graphics stress test is initiated by the overclocking control module. The graphics test sequence is executed and the overclocking control module monitors the number of errors generated by the execution of the graphics test sequence. In one embodiment, overclocking control module 135 includes a graphics pipeline stress tester 162 to detect errors generated in response to a graphics test sequence. The errors may be any type of error associated with GPU 125 and its associated graphics memory. Examples of errors include corruption of graphical data at one or more points of the graphics pipeline, hangs, and pixel errors.

The graphics test sequence may be any sequence of graphical operations selected to be likely to generate errors when one or more overclocking parameters increases to maximum safe levels. A threshold maximum number of errors for the graphics stress test can be used to define an overstressed condition, i.e., a condition where the system is excessively overclocked.

An exemplary graphics test sequence for stress testing includes an exclusive or (XOR) operation of three-dimensional surfaces (e.g., texture, render, and Z surfaces), and examining uniformity to determine errors. In one embodiment, single and multiple errors are counted and must be below a threshold number to pass the test. Such a graphics stress test is comparatively fast, and may, for example, be executed in about 100 milliseconds on a GeForce FX5800™ GPU chip developed by the NVIDIA Corporation of Santa Clara, Calif. It will be understood that the stress test may be performed several times (e.g., three) to increase its statistical reliability.

A fan controller 172 may be included to regulate a variable speed fan 195, a chip voltage controller 174 to regulate overclocking voltages, and a clock controller 176 to regulate clock parameters. Clock controller 176 adjusts the GPU core clock rate output by GPU core clock signal generator 178. Additionally, clock controller 176 adjusts the memory clock rate output by memory clock signal generator 180. In one embodiment, memory clock signal generator 180 is comprised of a two-stage phase locked loop (PLL). Memory clock rate adjustments are preferably made in a sequence of small steps to facilitate the two-stage phase locked loop (PLL) settling down. An output of a thermal sensor 164 may also be coupled to overclocking control module 135. Some aspects of these control elements are described in pending patent application U.S. patent application Ser. No. 10/295,748, entitled "A Processor Temperature and Mode Adjustment System," filed Nov. 14, 2002, which is commonly owned by the assignee of the present invention, and which is hereby incorporated by reference.

The graphics stress test sequence may be used in several different ways to determine safe overclocking parameters. In one embodiment of a manual mode of operation, a user selects a set of overclocking parameters and the system applies the stress test The system then applies the new set of overclocking parameters if it passes the stress test and may, for example, provide an indication if the set of overclocking parameters fails the stress test. In an automatic mode of operation, the stress test is automatically applied and used by the system to determine optimum overclocking parameters.

Figure 3:
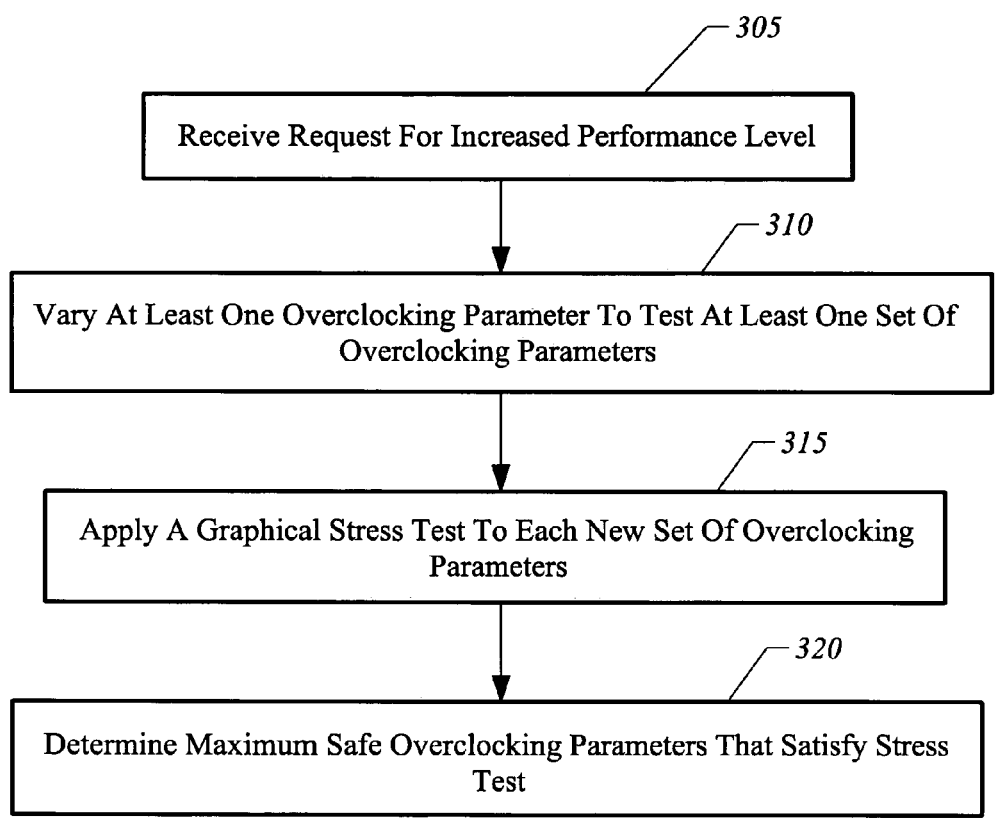
FIG. 3 is a flow chart in accordance with one embodiment of the present invention.

FIG. 3 is a flowchart illustrating one method of automatically selecting overclocking parameters. The system receives 305 a user request for an increased performance level (e.g., a request to select overclocking parameters). The system then adjusts 310 at least one overclocking parameter to form a new set of overclocking parameters having at least one unique overclocking parameter. For each new selection of overclocking parameters, the system applies 315 a graphical stress test that evaluates the graphical performance of the graphics system. The system then determines 320 threshold overclocking parameters that pass the stress test. For example, the overclocking parameters may be progressively incremented by a preselected increment (e.g., 0.5 MHz increments for the core clock rate and 1 MHz increments for the memory clock rates) until the stress test fails. In this example, the overclocking parameters would correspond to the highest overclocking parameters that pass the stress test (e.g., a maximum clock rate of one or more clocks of the graphics system, such as a maximum core clock rate of the GPU). In one embodiment, the threshold overclocking parameters are decreased by a safety margin, since this increases the reliability and stability of the result. The safety margin may, for example, correspond to setting the clock rates to the second highest supported level that passed the stress test or to setting the clock rates slightly below the highest supported level that passed the stress test. Additionally, in some embodiments other non-graphical stress factors may be used to select the safety margin. For example, the chip temperature measured by a thermal sensor 164 may be used to define a maximum operating temperature. In this example, the overclocking parameters may be reduced by a sufficient safety margin to maintain the chip temperature below a maximum safe operating temperature.

Figure 4:
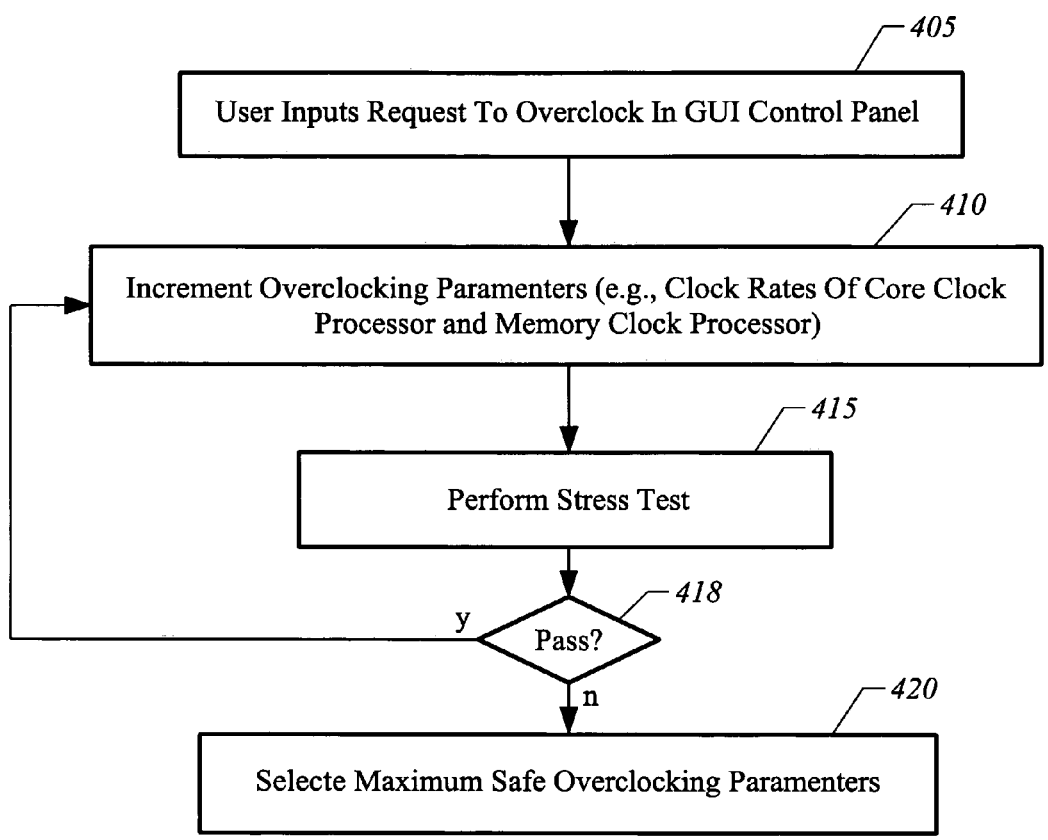
FIG. 4 is a flow chart in accordance with one embodiment of the present invention.

FIG. 4 is a flowchart illustrating a method of automatically selecting clock rates in a graphics system. A user request is received 405 for an increase in performance level. In one embodiment, the request is made by selecting a control element of a displayed control panel of a graphical user interface. The system progressively increases 410 the clock rate of at least one of the graphics processor clock and the memory clock to form a new set of clock rates to be evaluated. In some embodiments, only the graphics processor core clock rate is adjusted whereas in other embodiments both the graphics processor core clock rate and the memory clock rate are adjusted. For example, the system may have an array of sets of supported memory clock and core clock rates that may be incremented in steps from a default setting. For each set of new clock rates, the system applies a stress test 415 to evaluate errors associated with a graphics test sequence. The system then determines 418 whether the new set of clock rates pass the stress test. If the new set of clock rates pass the stress test, the clocks are incremented 410 and the stress test run again. However if the new clocks fail the stress test, the testing is discontinued. The system then sets the new clock rates 420. In some embodiments, the user is also provided with a notification, such as on a control panel display, of the new clock rates.

Additionally, for each set of clock rates that is tested, the system may also adjust other associated overclocking parameters, such as chip voltage, memory timing register values, memory drive/slew values, or fan speeds. These settings may be stored as a table or be selected using an algorithm. In one embodiment, an internal table of supported ranges of core clock and memory clock settings is maintained for each performance level along with associated chip voltage, memory timing, and fan speeds. The internal table may, for example, be used to select an initial starting point and maximum safe end values for overclocking. In one embodiment, the internal table includes a maximum safe clock settings for overclocking for a selected performance level of the system (e.g., two dimensional graphics performance level, three dimensional graphics performance level, or maximum three dimensional graphics performance level). For example, in one embodiment, the internal table may include an entry of 500 MHz for a maximum memory clock rate and 500 MHz for a maximum core clock rate. The chip voltage, memory timing, and fan speeds associated with a core clock rate and memory clock rate setting may affect the system noise, battery lifetime, or lifetime of the graphics components. For example, core clock rates beyond a preselected rate may have the highest fan settings and chip voltages. As another example, if two or more memory clock rates are supported, each memory clock rate may have its own associated memory timing and drive/slew pointers.

Figure 5:
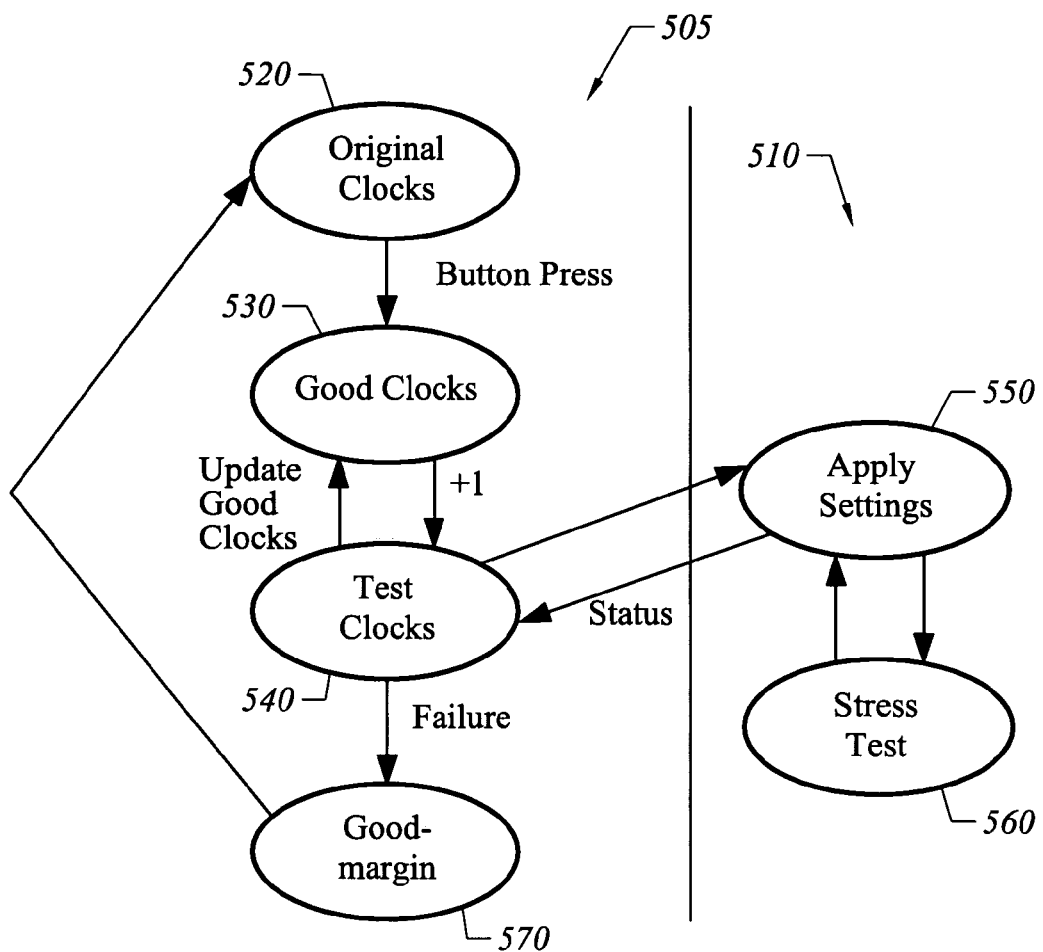
FIG. 5 is a flow chart in accordance with one embodiment of the present invention.

It will be understood that the present invention includes embodiments in which automatic overclocking setting module 120 is implemented as a driver module that receives commands from a control panel and makes function calls upon overclocking control module 134. FIG. 5 is a flow chart illustrating interactions between a user's control panel side 505 and automatic overclocking setting software driver side 510 for one embodiment of the present invention. On control panel side 505, the clocks presented to the user begin in an original clock state 520. A user presses a button to determine 530 good clocks. The clocks are incremented and enter a test clocks state 540. On driver side 510, the driver makes a function call upon overclocking control 135 to apply settings 550. The settings that are applied include not only the clock rates but may also include other settings for the new clock rates, such as for example chip voltage, memory timing, drive/slew settings, and fan speed. The driver then makes a function call to instantiate a stress test state 560 in which the graphics stress test is applied. A status (result) is returned to control panel side 520 by the driver module. If the stress test was successful, the good clocks are updated and the clock rates will be progressively iterated for further testing. However, if the stress test was unsuccessful, a failure is recorded and the system enters a good margin test 570. Good margin test 570 determines an appropriate safe margin below the highest clock setting that passed the stress test. The system then updates the clocks with the clocks set to the highest clock settings having a safe margin.

Figure 6:
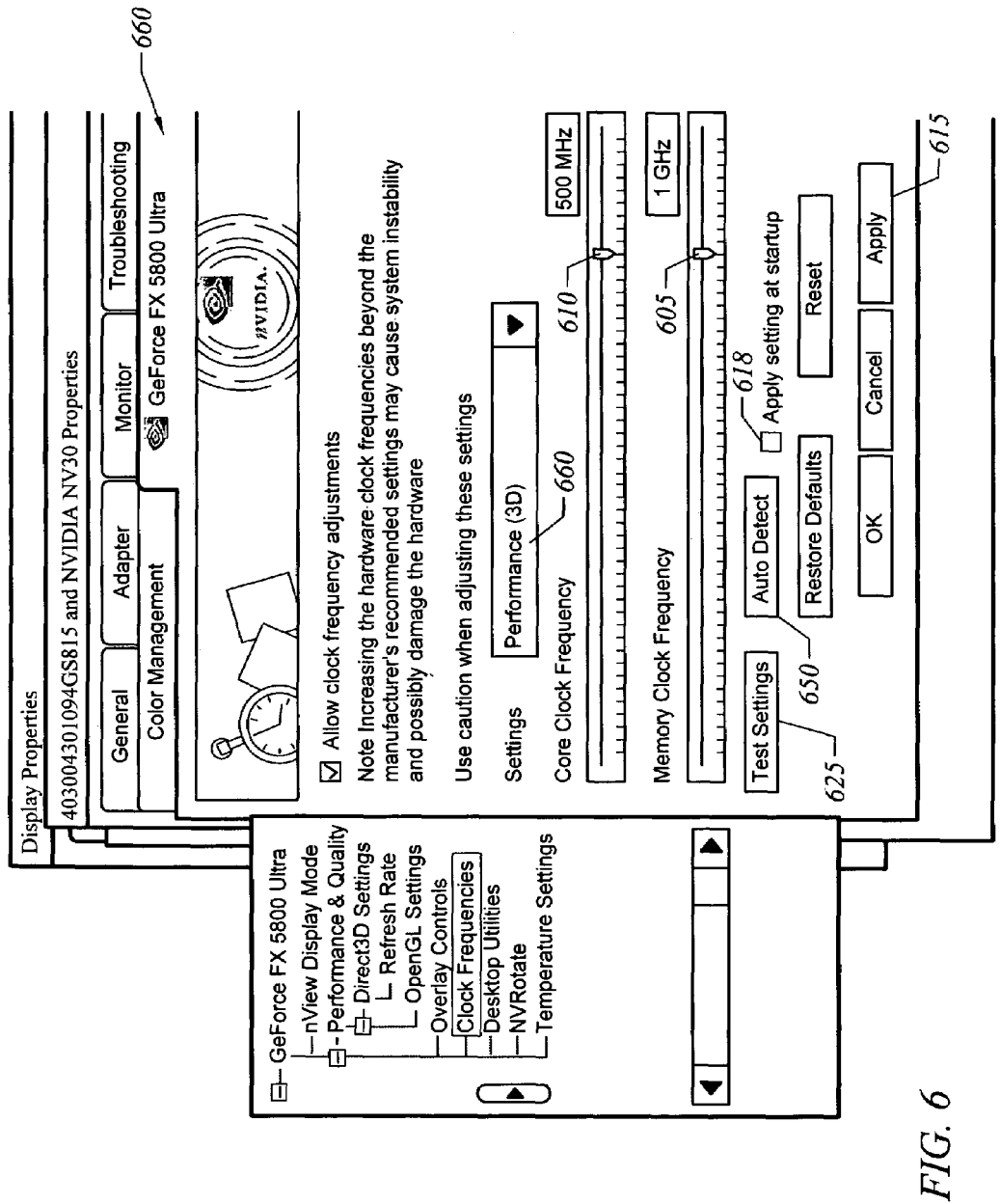
FIGS. 6-8 show exemplary screen shots in accordance with one embodiment of a graphical user interface of the present invention.
Figure 7:
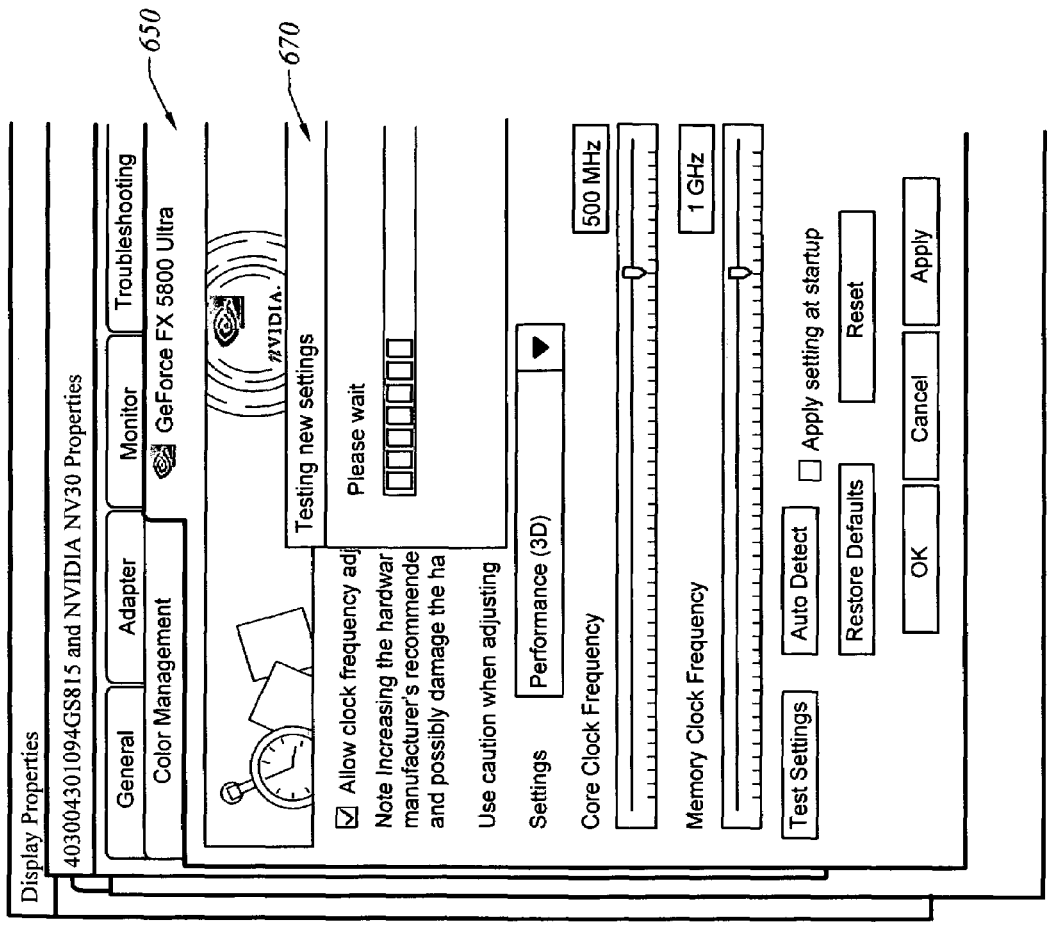
Figure 8:
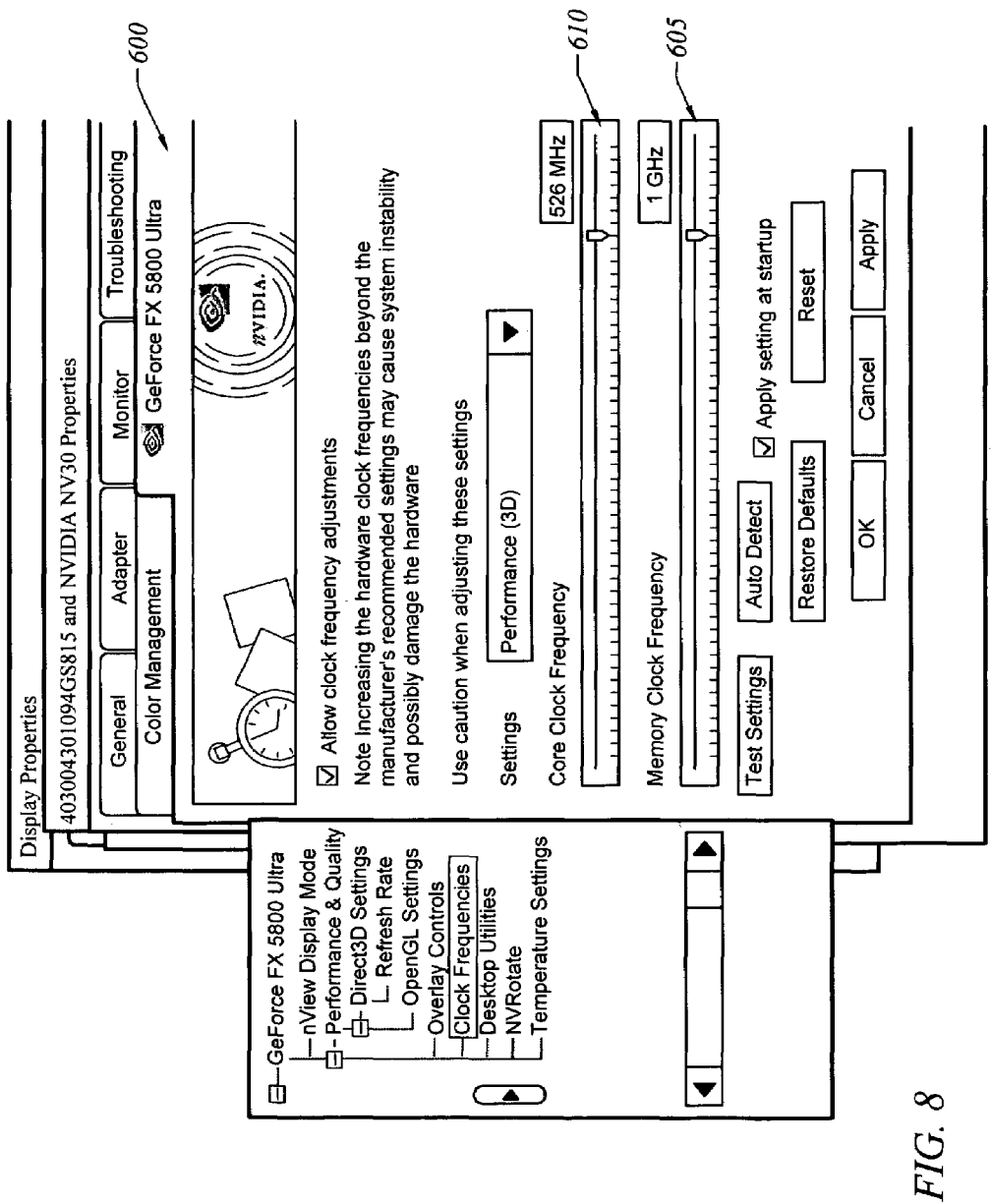

FIGS. 6-8 show portions of exemplary screen shots of an overclocking control panel 600 for use as part of one embodiment of a graphical user interface of the present invention. Referring to FIG. 6, overclocking control panel 600 includes a high performance level setting 660, such as a setting to overclock the GPU for high performance three-dimensional graphics. A core clock rate control bar 610 may be included to display core clock frequency. A memory clock rate control bar 605 may be included to display GPU core clock frequency. A test settings button 625 may be included to initiate a test of settings. Additionally, an autodetect button 650 is included to display detection and selection of optimum clock frequencies for the high performance mode. An apply button 615 may be included for a user to approve overclocking settings.

In one embodiment, a user may move the sliders of core clock rate control bar 610 and memory clock rate control bar 605 to manually select new overclocking settings and then press a button 625 to test the settings. The setting is applied only if it passes the stress test and the user presses apply button 615.

Note that in an illustrative example that the original (normal) core clock frequency of the GPU may be 500 MHz whereas the memory clock frequency may be 1 GHz. As indicated in FIG. 7, selecting autodetect button 650 launches the system in a mode in which it automatically tests new clock settings, i.e., it selects small increments of the core clock rate and memory clock rate and goes through the stress test in a loop. The control panel may include a notification window 670 to indicate to a user that the test mode has been entered.

As indicated in FIG. 8, upon completion of testing different clock frequencies and selecting optimum settings that pass the stress test, the core clock rate control bar 610 and memory clock rate control bar 605 are updated to indicate the new clock frequencies, which in this example corresponds to a core clock frequency of 526 GHz and a memory clock frequency of 1 GHz. In this example, only the GPU core clock rate is adjusted, although more generally the memory clock rate may also be adjusted. An apply button 615 may be provided for a user to instruct the system to apply the overclocking settings. Thus, in one embodiment the new overclocking parameters are applied dynamically without a reboot. Note that in one embodiment an apply settings at startup box 618 may be checked to indicate that the clock rates are to be saved for subsequent reboots. That is, a new setting that is selected is applied dynamically and will be utilized in subsequent logons. In one embodiment, this permits the new clock rates to be used as the default values for subsequent operation in the high performance level.

While the present invention has been described in detail in regards to setting GPU core clock rates, it will also be understood that the present invention may be applied to setting the clock rates of more than one clock of a graphics system. For example, some graphics systems include more than one GPU chip, graphical accelerators, or other components that may also be beneficially overclocked in accordance with the present invention. Additionally, an exemplary graphics system may include a CPU that is separate from a GPU; it will also be understood that the present invention may be applied to a graphics system having a CPU with a built-in graphics functionality. Additionally, it will also be understood that the present invention may be applied to graphics systems in which other overclocking parameters besides clock rate are incremented to determine an optimum set of overclocking parameters.

The present invention provides several benefits. First, a user may conveniently select optimum overclocking parameters for high performance operation. From the user's perspective, entering a command on a user interface launches automatic selection of optimum overclocking parameters. Second, the selection process is comparatively rapid. The integrated stress is extremely rapid such that the total time for the graphics system to automatically optimize overclocking parameters is comparatively short. By way of comparison, if a user tried to manually optimize overclocking parameters they would need to manually select and input a number of different overclocking parameters and run time-consuming benchmark programs for each selection. Third, the integrated stress test can be run without destabilizing or hanging the chip. It supports continuous user control, avoiding corruption during overclocking. In contrast, manual overclocking can result in the chip hanging or otherwise becoming corrupted if excessive overclocking parameters are selected manually by a user to attempt to determine the maximum overclocking parameters, requiring a user to reboot their system.

It will be understood that an embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A graphics system, comprising:
   a graphics processing unit (GPU), comprising:
      a graphics pipeline; and
      an overclocking control module disposed in said GPU configured to evaluate overclocking parameters in response to a function call received by the GPU, the overclocking control module including:
         a clock controller to control a GPU clock signal generator and a memory clock generator; and
         a graphics pipeline stress tester to implement a stress test that includes executing a graphics test sequence in said graphics pipeline for selected overclocking parameters and monitoring errors of said graphics pipeline.

2. The graphics system of claim 1, wherein said graphics system includes computer executable instructions for running a control panel program for selecting overclocking parameters and wherein a driver program initiates function calls to said GPU to evaluate overclocking parameters.

3. The graphics system of claim 1, wherein said graphics system determines a maximum safe GPU clock rate.

4. The graphics system of claim 1, wherein said graphics system determines a maximum safe memory clock rate of a graphics memory associated with said GPU.

5. The graphics system of claim 1, wherein said graphics system determines a maximum safe GPU clock rate and a maximum safe memory clock rate of a graphics memory associated with said GPU.

6. The graphics system of claim 1, further comprising:
   a central processing unit coupled to said GPU; and
   a driver program to initiate function calls to said GPU, the driver program identifying sets of overclocking parameters to be evaluated by said GPU from a set of supported overclocking parameters pre-selected for said graphics system that includes a set of graphics processor core clock rates and memory clock rates having an initial starting point and a maximum end point associated with a graphics processor and a graphics memory, the GPU for each set of overclocking parameters automatically applying the stress test with the graphics system and determining a safe set of overclocking parameters within a set of supported overclocking parameters passing said stress test.

7. The graphics system of claim 6, wherein each of supported overclocking parameters includes a fan speed and the fan speed is automatically selected for said safe set of overclocking parameters.

8. The graphics system of claim 6, wherein said set of supported overclocking parameters includes chip voltages, memory timings, and fan speeds and forming said sets of overclocking parameters further comprises: adjusting at least one clock rate to form at least one new clock rate; and setting a chip voltage, memory timing, and a fan speed for each said at least one new clock rate.

9. The graphics system of claim 6, wherein said set of supported overclocking parameters is stored in an internal table.

10. A graphics system, comprising:
    a graphics processing unit (GPU), comprising:
       a graphics pipeline; and an overclocking control module disposed in said GPU configured to evaluate overclocking parameters in response to a function call received by the GPU, the overclocking control module implemented at least in part as hardware and including:
a clock controller to control a GPU clock signal generator and a memory clock generator; and
a graphics pipeline stress tester to implement a stress test that includes executing a graphics test sequence in said graphics pipeline for selected overclocking parameters and monitoring errors of said graphics pipeline; and
a central processing unit coupled to said GPU;
wherein the graphics system includes computer executable instructions for running a control panel program for selecting overclocking parameters and wherein a driver program initiates function calls to said GPU to evaluate overclocking parameters.

11. The graphics system of claim 10, wherein the driver program identifies sets of overclocking parameters to be evaluated by said GPU from a set of supported overclocking parameters pre-selected for said graphics system that includes a set of graphics processor core clock rates and memory clock rates having an initial starting point and a maximum end point associated with a graphics processor and a graphics memory, the GPU for each set of overclocking parameters automatically applying the stress test with the graphics system and determining a safe set of overclocking parameters within a set of supported overclocking parameters passing said stress test.

12. The graphics system of claim 11, wherein each of the supported overclocking parameters includes a fan speed and the fan speed is automatically selected for said safe set of overclocking parameters.

13. The graphics system of claim 11, wherein said set of supported overclocking parameters includes chip voltages, memory timings, and fan speeds and forming said sets of overclocking parameters further comprises: adjusting at least one clock rate to form at least one new clock rate; and setting a chip voltage, memory timing, and a fan speed for each said at least one new clock rate.

14. The graphics system of claim 11, wherein said set of supported overclocking parameters is stored in an internal table.

15. The graphics system of claim 10, wherein said overclocking control module comprises a combination of hardware and software.

16. A graphics system, comprising:
a graphics processing unit (GPU), comprising:
a graphics pipeline; and
an overclocking control module comprising a combination of hardware and software disposed in said GPU configured to evaluate overclocking parameters in response to a function call received by the GPU, the overclocking control module including:
a clock controller to control a GPU clock signal generator and a memory clock generator; and
a graphics pipeline stress tester to implement a stress test that includes executing a graphics test sequence in said graphics pipeline for selected overclocking parameters and monitoring errors of said graphics pipeline.

17. The graphics system of claim 16, wherein the graphics system includes computer executable instructions for running a control panel program for selecting overclocking parameters and wherein a driver program initiates function calls to said GPU to evaluate overclocking parameters.

18. The graphics system of claim 16, further comprising a driver program to identify sets of overclocking parameters to be evaluated by said GPU from a set of supported overclocking parameters pre-selected for said graphics system that includes a set of graphics processor core clock rates and memory clock rates having an initial starting point and a maximum end point associated with a graphics processor and a graphics memory, the GPU for each set of overclocking parameters automatically applying the stress test with the graphics system and determining a safe set of overclocking parameters within a set of supported overclocking parameters passing said stress test.

* * * * *